INVENTORS:
ROY G. SMALTZ
WILLIAM A. SATTERWHITE
PAUL R. ROBERTS

BY: *Carl C. Batz*
ATT'Y

INVENTORS:
ROY G. SMALTZ
WILLIAM A. SATTERWHITE
PAUL R. ROBERTS
BY: Carl C. Batz
ATT'Y

INVENTORS:
ROY G. SMALTZ
WILLIAM A. SATTERWHITE
PAUL R. ROBERTS

Carl C. Batz
ATT'Y

INVENTORS:
ROY G. SMALTZ
WILLIAM A. SATTERWHITE
PAUL R. ROBERTS
BY: *Carl C. Batz*
ATT'Y

United States Patent Office 3,498,746
Patented Mar. 3, 1970

3,498,746
RECOVERY OF FLUOSILICIC ACID AND $P_2O_5$ FROM RECYCLE STREAMS AND POND WATER
Roy G. Smaltz, Valrico, William A. Satterwhite, Lakeland, and Paul R. Roberts, Plant City, Fla., assignors, by mesne assignments, to United States Steel Corporation, a corporation of Delaware
Filed Nov. 29, 1967, Ser. No. 686,558
Int. Cl. C01b 33/10, 25/26
U.S. Cl. 23—153                6 Claims

ABSTRACT OF THE DISCLOSURE

Waste water from the manufacture of wet process phosphoric acid from phosphate rock and containing $P_2O_5$ fluoride and silica compounds is normally passed into a pond exposed to weather conditions leading to evaporation of water and the concentration of the $P_2O_5$ and fluoride values, and is utilized together with a recycle stream from the process which also contains $P_2O_5$ and fluoride values to dilute concentrated sulfuric acid so that the dilute acid containing $P_2O_5$ may be used in the digestion of phosphate rock for the recovery of the $P_2O_5$ while under the heat of dilution fluoride and silica compound vapors are evolved and condensed by contact with water and recovered as fluosilicic acid product.

BACKGROUND AND SUMMARY

In the manufacture of wet process phosphoric acids and other phosphatic materials, considerable water is used in washing and other steps and waste water which has to be disposed of is passed into a large pond where it is exposed to the elements which bring about evaporation of the water and concentration of $P_2O_5$ and fluoride values. Not only is the pond water considered a waste material but also it presents a hazard in that under exposure to the sun and atmospheric conditions there is some evolution of fluorine, and further, in the case of heavy rains, some of the pond water may overflow into streams.

We have discovered that pond water can be used together with recycle streams in the process which also contain $P_2O_5$ and fluorine values for the dilution of concentrtaed sulfuric acid to bring it to a dilute condition in which it is most effective in the digestion of phosphate rock. The $P_2O_5$ of the pond water and of a recycle stream is recovered while at the same time under the heat of dilution fluoride and silica compound vapors are evolved and the vapors condensed by contacting them with water and then recovered as a valuable fluosilicic acid product.

DRAWINGS

Figure 1:
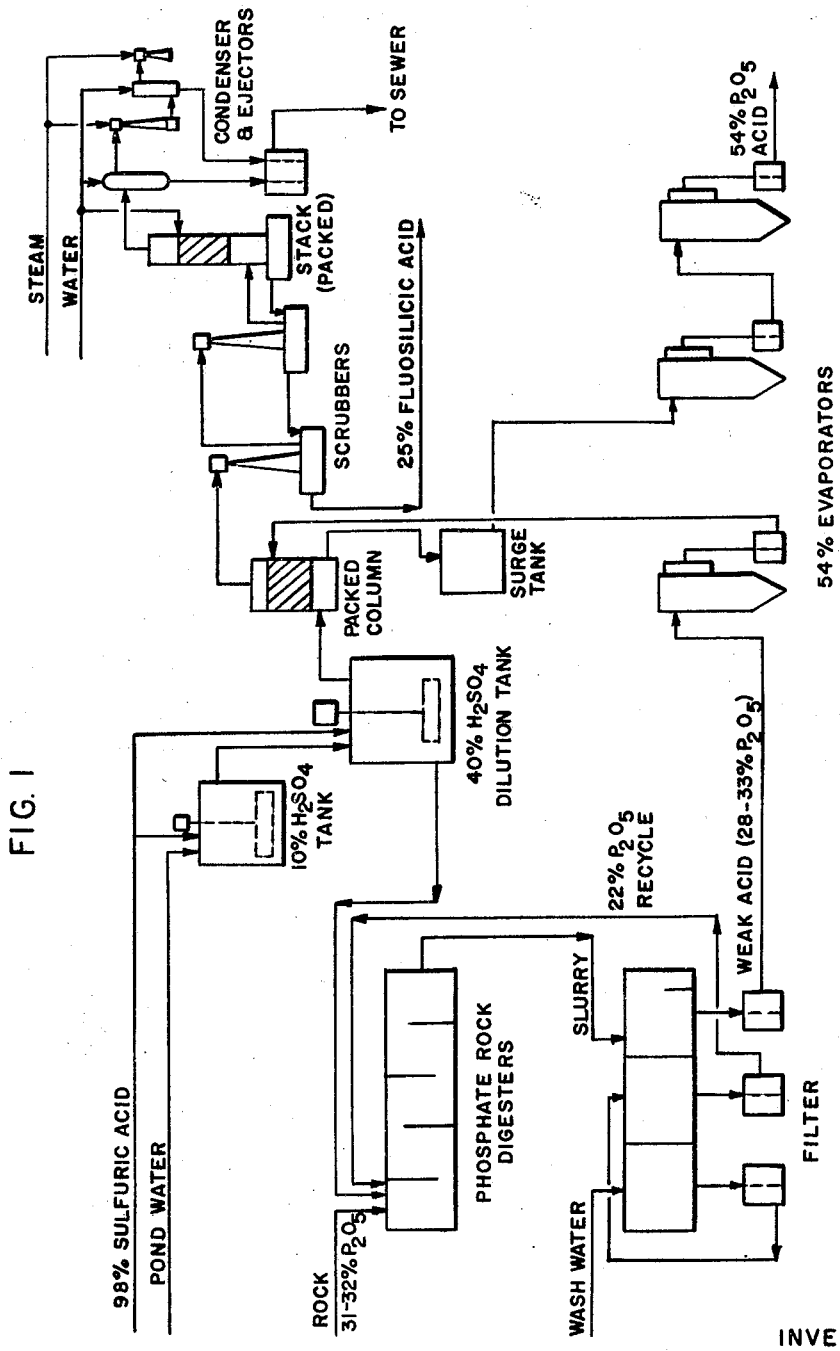
Figure 2:
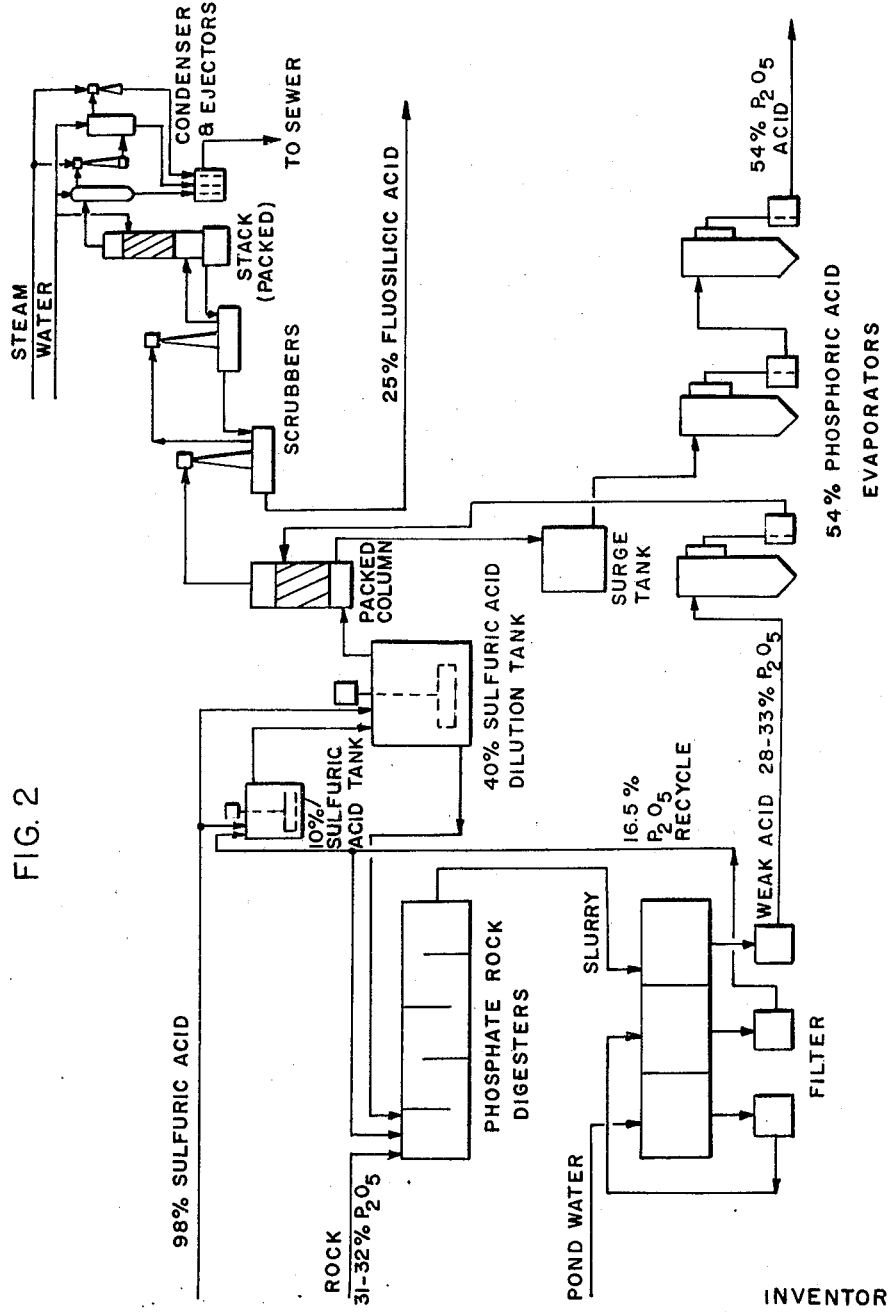
Figure 3:
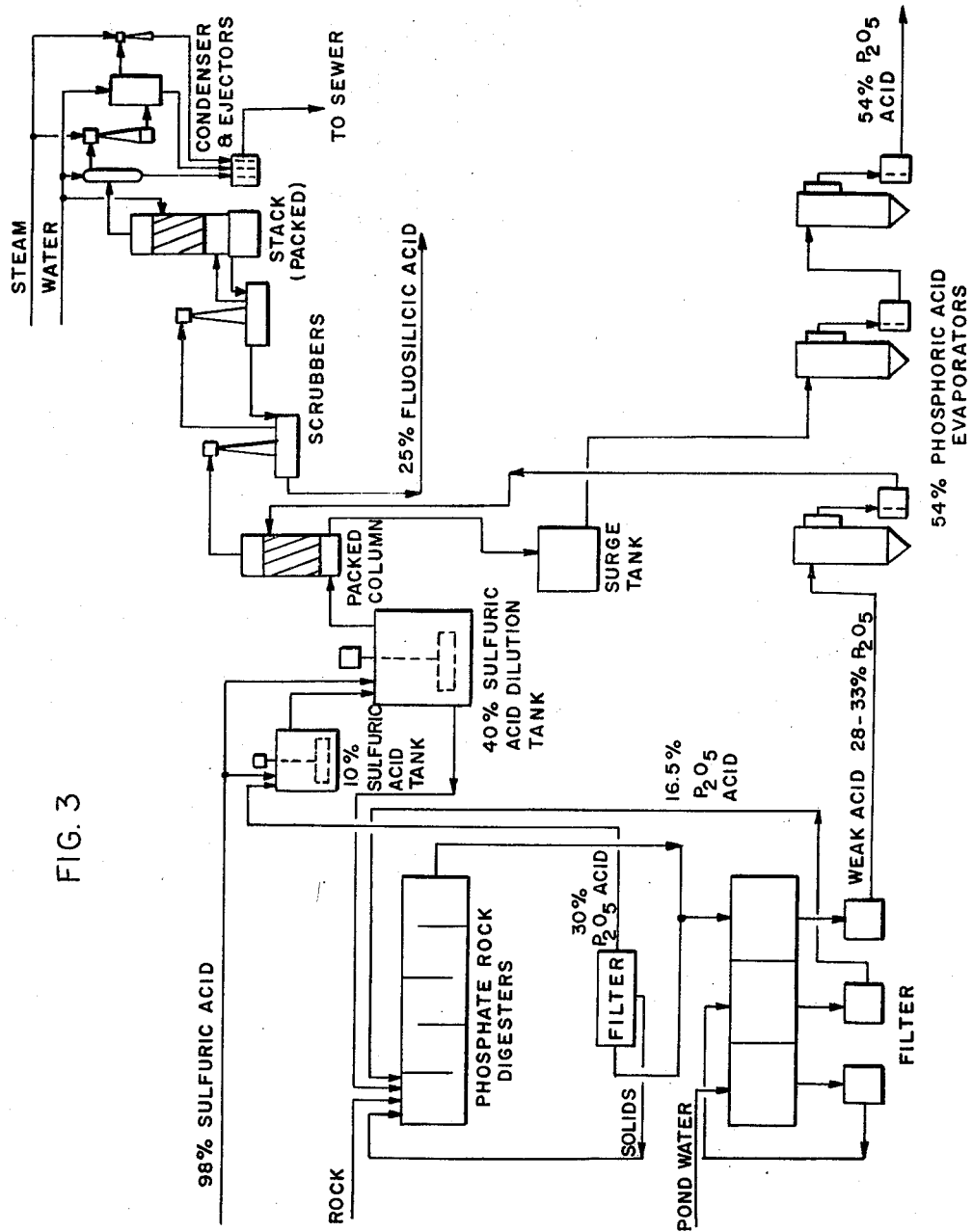
Figure 4:
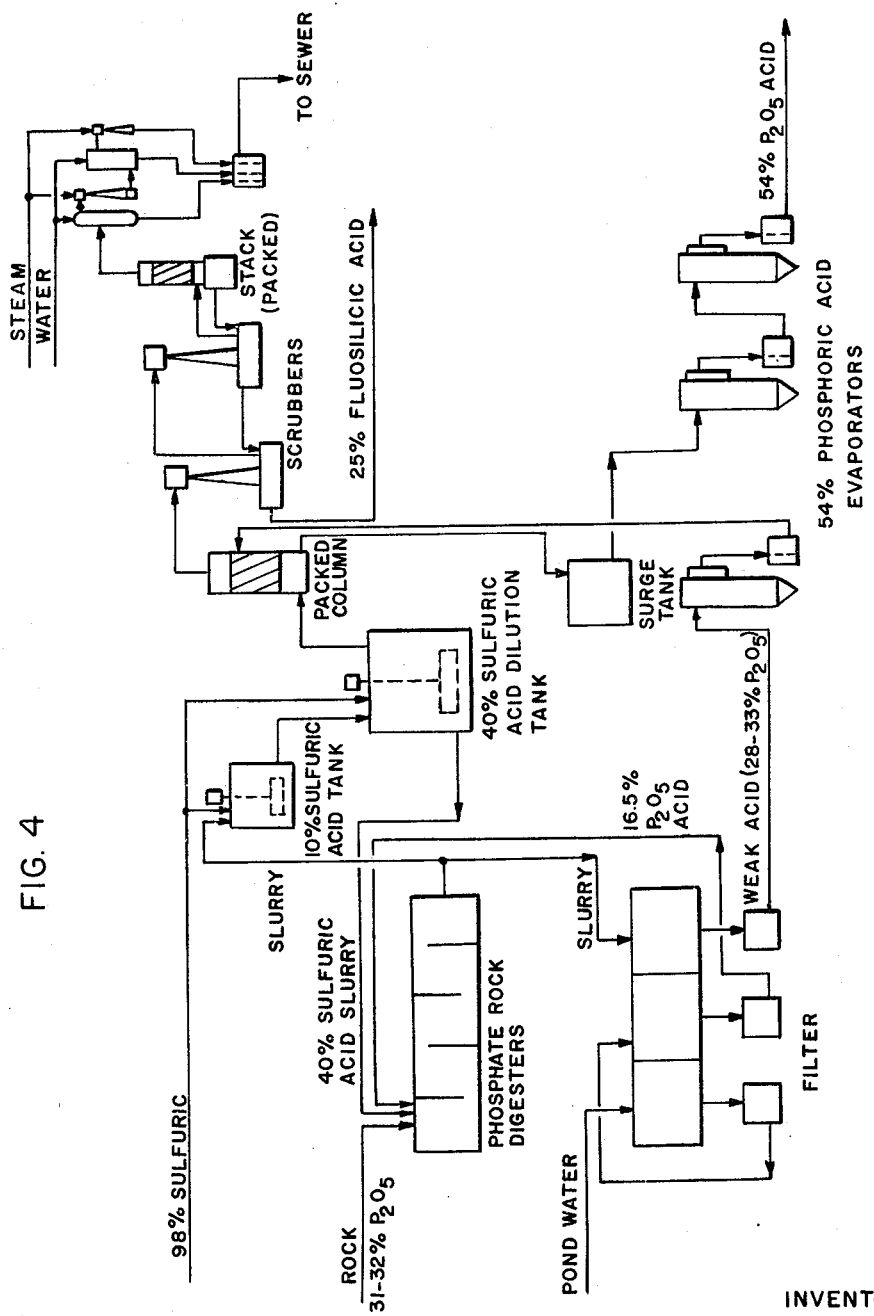

In the accompanying drawings, FIG. 1 is a diagrammatic flow sheet showing the use of pond water for the dilution of sulfuric acid in the rock digestion system; FIG. 2, a diagrammatic view similar to FIG. 1, but showing the introduction of pond water into the filter system of the process and the recyclicing of weak acid containing wash water from the filters to the dilution tank; FIG. 3, a view similar to FIG. 2, but showing the recycling of filtrate from the first filter to the dilution tank; FIG. 4, a view similar to FIG. 2 but showing the recycling of slurry from the digester to the dilution tank; and FIG. 5, a view similar to FIG. 2 but showing steps involving the concentration of the acid in evaporators.

DETAILED DESCRIPTION

Pond water under the exposure conditions of sun and wind brings about a concentration of $P_2O_5$ values, reaching as high as 0.5–2.5 percent and higher, while the fluorine dissolved in the pond water increases to about 0.5–1.0 percent. In addition, the recycle streams used in the process consisting of weak recycle acids leaving the filters after wash water is applied, strong recycle acid leaving the filters before washing, and the slurry which may be filtered or unfiltered, all contain substantial $P_2O_5$ values and fluorine values. By introducing pond water into the system in place of fresh water and by using a recycle stream for diluting the concentrated sulfuric acid, it is possible to recover not only the $P_2O_5$, and fluorine values in the pond water, but also the additional fluorine values in the recycle stream and in one operation.

The pond water may be introduced at any point in the system. It may be introduced as wash water at the filters, or it may be introdued into the digestive system or it may be introduced at the diluter reactor. It can be introduced at any point where fresh water has heretofore been used in the system and by merging it with the recycle stream, it is possible to recover, as stated above, the $P_2O_5$ and fluorine contents of the pond water.

In the illustration given in FIG. 1, concentrated sulfuric acid (98%) and pond water are introduced into a dilution tank. We prefer to pass the pond water and some of the sulfuric acid through a pre-dilution tank, as shown in FIG. 1. The advantage of the pre-dilution step in which a fraction (10%) of the sulfuric acid is used with the pond water is that the calcium ion is precipitated on calcium sulfate crystals and the subsequent completion of the dilution is more effectively carried out. Otherwise extensive scaling and solids build-up on equipment surfaces results and shutdowns are frequent to clean out the build-up.

In the dilution tank the concentrated sulfuric acid is preferably reduced to about 25–70% sulfuric acid and the dilute acid is returned to the digestion step for the digestion of phosphate rock. Best results have been obtained when the sulfuric acid is diluted to about 40% acid. The dilute sulfuric acid carries with it the $P_2O_5$ values of the pond water and these values are carried directly into the phosphate rock digesters. The digested material which preferably contains about 31–32% $P_2O_5$, but which may contain a wide range of $P_2O_5$ values, is passed to filters and washed with water, a weak recycle stream being returned to the digesters as shown in FIG. 1. The wash water may consist of pond water or water from any source. Weak acid from the filters may be passed to evaporators and a concentrated acid such as, for example, 54% $P_2O_5$ acid, recovered as product.

The heat of dilution in the dilution tank brings about an evolution of fluoride and silica compound vapors which may be passed through a packed column and used to strip more fluorine from other plant streams and thence on to scrubbers where they are condensed with water and thus form fluosilicic acid which is recovered as product. If desired, the water containing the condensed fluoride and silica vapors may be filtered to remove $SiO_2$. For final scrubbing of the gases, water is preferably introduced through a packed column and flows counter-current to the flow of gases and a vacuum is maintained upon the column by a barometric condenser as shown in conventional apparatus illustrated in FIG. 1. If desired, other phosphoric acid streams may be passed down the packed column, as shown in FIG. 1, defluorinated acid being recovered from the bottom of the packed tower and passed to a surge tank and from thence to evaporators, as also shown in FIG. 1.

In the illustration given in FIG. 2, the operation is as shown in FIG. 1 except that the pond water is introduced as wash water in the filter system and the weak filtrate is recycled to the pre-dilution (indicated as "10% $H_2SO_4$ Tank") tank where it meets a portion of the sulfuric acid, the combined material being passed into the dilution tank indicated on the drawing as "40% $H_2SO_4$ Dilution Tank."

In the operation shown in FIG. 3, pond water is also introduced into the filter system and the recycle stream to the "10% $H_2SO_4$ Tank" is the filtrate directly leaving the first filter and containing a substantial amount of $P_2O_5$ as, for example, 30% $P_2O_5$.

In the operation shown in FIG. 4, pond water is introduced as wash water in the filter system and slurry is passed from the digestion system to the pre-dilution acid tank. Otherwise the operation is as described above in connection with FIG. 1.

Figure 5:
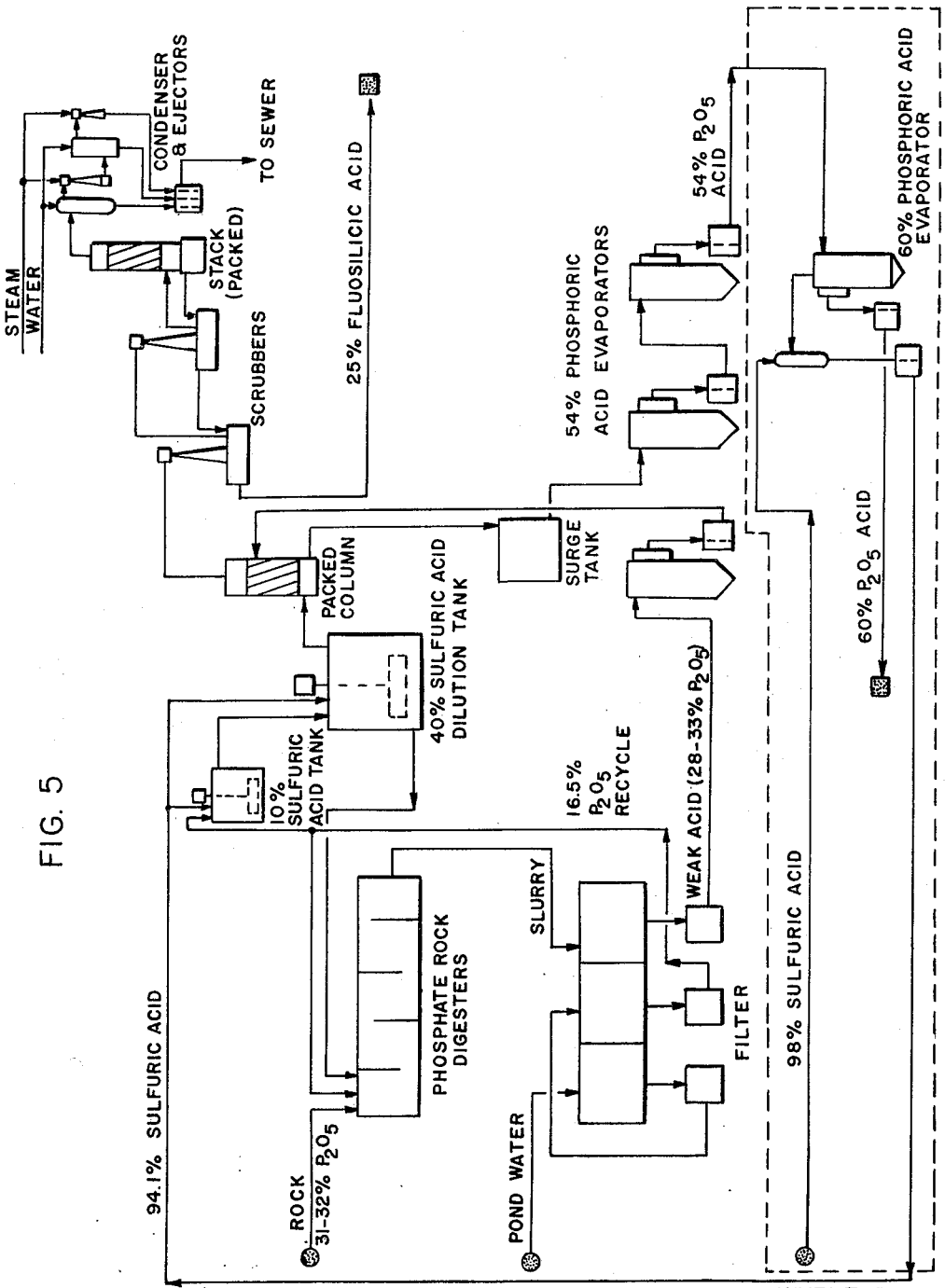

FIG. 5 shows an operation which is similar to that described in FIG. 2 but shows in addition the concentration of the 54% $P_2O_5$ acid to 60% $P_2O_5$ acid. The figures "54% $P_2O_5$ and 60% $P_2O_5$" are merely illustrative of lower and higher concentrated acids which in practice may have a relatively wide range. In the concentration of the acid, a barometric condenser indicated by the numeral 20 is employed to maintain the concentrator under very high vacuum. We find it advantageous to introduce the concentrated acid (98%) into the barometric condenser where it meets the steam and fluorine vapors leaving the phosphoric acid concentrating vessel. In this operation the concentrated sulfuric acid may be diluted to about 94% acid by condensing steam and the 94% acid may be returned, as shown in FIG. 5, to the "10% $H_2SO_4$ Tank" and the "40% $H_2SO_4$ Dilution Tank."

In all of the foregoing operations described in FIGS. 1–5 inclusive, pond water may be employed to replace fresh water used in the system and may be added at any places where heretofore fresh water was used. The concentrated acid may be diluted from about 98% to about 25–70% in the dilution tank. If desired, the starting sulfuric acid may be 93–40% sulfuric acid, but we prefer to start with an acid in the range of about 94–98%

Specific examples illustrative of the invention may be set out as follows.

Example I

Dilution of 98% sulfuric acid to various concentrations with weak filtrate (recycle) phosphoric acid was completed at atmospheric pressure. The dilutions were completed in an agitated beaker sitting in a heating mantel. The purpose of the heating mantel was to maintain the solution at its boiling temperature for thirty minutes retention. Tests were completed with the following acids:

|  | Percent $P_2O_5$ | Percent F | Percent $SO_4$ |
|---|---|---|---|
| Weak filtrate | 22.86 | 1.90 | 2.56 |
| Sulfuric acid | | | 98.13 |

The following results were obtained:

| Approximate dil. of $H_2SO_4$ | Final solutions | | | Evolution, % of F * |
|---|---|---|---|---|
| | Percent $P_2O_5$ | Percent $SO_4$ | Percent F | |
| 50 | 12.70 | 48.29 | 0.17 | 84.1 |
| 60 | 11.19 | 58.77 | 0.06 | 93.6 |
| 70 | 7.54 | 67.18 | 0.02 | 98.3 |

*Calculated from percent F and percent $P_2O_5$ analyses.

Example II

Dilution of 98% sulfuric acid to 40% sulfuric acid with weak filtrate (recycle) phosphoric acid was completed at 6 inches of mercury absolute pressure. The retention time was varied and the fluorine evolution efficiencies were determined.

The dilutions were made with batchwise additions of the sulfuric acid and weak filtrate phosphoric acid into an insulated aspirator bottle with agitation. Acids of the following analyses were used for the test:

|  | Percent $P_2O_5$ | Percent F | Percent $SO_4$ |
|---|---|---|---|
| Weak filtrate | 23.73 | 2.22 | 2.71 |
| Sulfuric Acid | | | 96.5 |

The following results were obtained:

| Retention time, minutes | Final solutions | | | Evolution, % of F * |
|---|---|---|---|---|
| | Percent $P_2O_5$ | Percent $SO_4$ | Percent F | |
| 20 | 14.62 | 42.59 | .41 | 70.3 |
| 30 | 14.45 | 43.44 | .40 | 70.4 |
| 40 | 14.55 | 43.46 | .28 | 79.4 |

*Calculated from percent F and percent $P_2O_5$ analyses.

Higher percentages of fluorine evolution would be anticipated in plant scale facilities where better heat conservation and stream controls would be practiced. Also higher evolution may be achieved through supplemental stream sparging.

While in the foregoing specification, we have set out specific procedure in considerable detail for the purpose of illustrating embodiments of the invention, it will be understood that such details may be varied widely by those skilled in the art without departing from the spirit of our invention.

We claim:

1. In a phosphate rock treating system requiring the addition of water and in which phosphate rock is digested in a digestion zone with sulfuric acid, and the digested mixture is filtered, and washed, producing filtrate and slurry streams, at least one of said streams being recycled to the digestion zone, the steps of supplying pond water containing $P_2O_5$ and fluoride values to said system to merge with said recycle stream, and diluting concentrated sulfuric acid with said recycle stream whereby under the heat of dilution fluoride vapors are evolved and subsequently condensed by contact with water and recovered as fluosilicic acid product.

2. The process of claim 1 in which said pond water is used as wash water in the filtering step, and the filtrate containing pond water is used to dilute the concentrated sulfuric acid and the dilute acid recycled to the digestion zone.

3. The process of claim 1 in which the bulk of the sulfuric acid is diluted in one dilution zone and in which a small portion of the concentrated sulfuric acid is pre-diluted with water selected from the group consisting of pond water and said recycle stream to precipitate calcium sulfate therein.

4. The process of claim 1 in which phosphoric acid product is withdrawn from the system and concentrated under reduced pressure maintained by a barometric condenser and in which the concentrated sulfuric acid is introduced into said barometric condenser in contact with vapors from the concentration zone to dilute the sulfuric acid and the diluted acid then contacted with said recycle stream.

5. In a process in which phosphate rock is digested with sulfuric acid in a digestion zone and then the digested mixture is filtered and washed producing filtrate and slurry streams, and at least one of said stream is recycled to said digestion zone, the steps of continuously adding pond water containing $P_2O_5$ and fluoride values as wash water during the step of filtration and then diluting concentrated sulfuric acid with said recycle stream to recover $P_2O_5$ in said dilute sulfuric acid, while under the heat of dilution fluoride vapors are evolved, condensing said vapors by contact with water, and recovering fluosilicic acid as product.

6. The process of claim 1 wherein said concentrated sulfuric acid is diluted to about 25% to 70% $H_2SO_4$ with said recycle stream.

References Cited

UNITED STATES PATENTS

| | | | |
|---|---|---|---|
| 1,938,533 | 12/1933 | Penfield | 23—153 |
| 2,636,806 | 4/1953 | Winter | 23—153 XR |
| 2,962,357 | 11/1960 | Williams et al. | 23—165 |
| 3,091,513 | 5/1963 | Parish | 23—153 |
| 3,151,941 | 10/1964 | Hollingsworth et al. | 23—165 |
| 3,256,061 | 6/1966 | Tufts et al. | 23—153 |
| 3,273,713 | 9/1966 | Parish | 23—153 |

OTHER REFERENCES

Smith's "College Chemistry," 7th Ed., 1960, p. 505. Appleton-Century-Crofts, Inc., New York.

EDWARD STERN, Primary Examiner

U.S. Cl. X.R.

23—122, 165, 182

Disclaimer 3,498,746.—*Roy G. Smaltz*, Valrico, *William A. Satterwhite*, Lakeland, and *Paul R. Roberts*, Plant City, Fla. RECOVERY OF FLUOSILICIC ACID AND $P_2O_5$ FROM RECYCLE STREAMS AND POND WATER. Patent dated Mar. 3, 1970. Disclaimer filed June 24, 1977, by the assignee, *United States Steel Corporation*.

Hereby enters this disclaimer to all of the claims therein of said patent.

[*Official Gazette August 23, 1977.*]